Dec. 25, 1928.  G. H. HAIFLEY  1,696,200
FISHING TOOL
Filed Sept. 22, 1927   2 Sheets-Sheet 1

Inventor
G. H. Haifley,
By J. Stanley Burch
Attorney

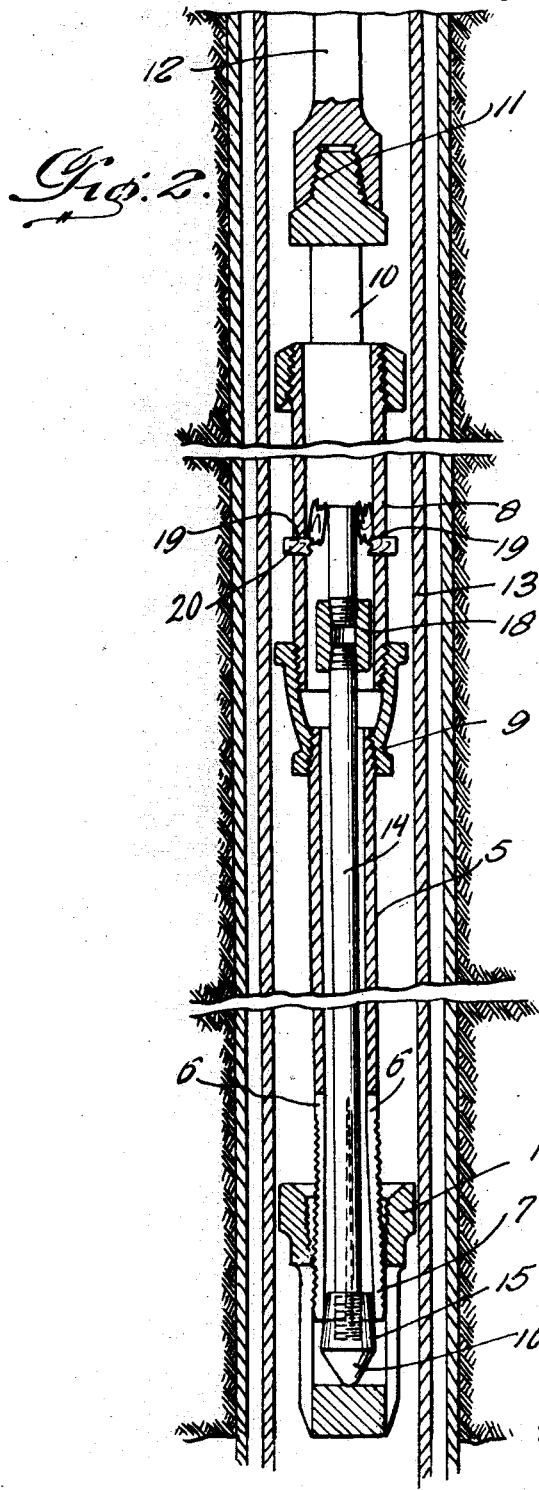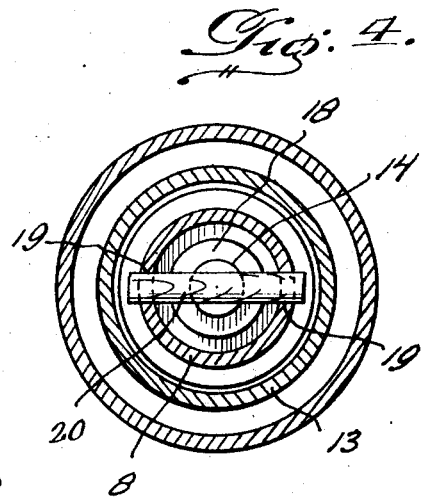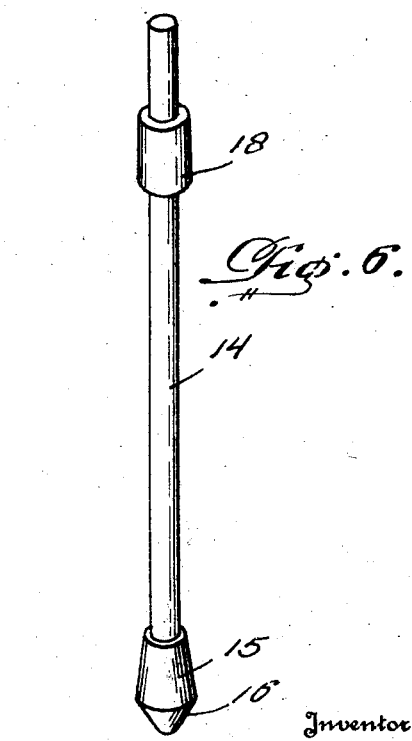

Patented Dec. 25, 1928.

1,696,200

UNITED STATES PATENT OFFICE.

GEORGE H. HAIFLEY, OF EUREKA, KANSAS, ASSIGNOR OF ONE-HALF TO GEORGE BERNARD, OF EUREKA, KANSAS.

FISHING TOOL.

Application filed September 22, 1927. Serial No. 221,180.

This invention relates to improvements in fishing tools for oil wells, and has particular reference to a tool for removing washers and lower cages from the well or pump tubings when the same become detached from the pump pistons.

The primary object of the present invention is to provide a simple and efficient device which is adapted to be lowered into the pump tubing for the purpose of engaging the detached washers and lower piston cage so that when the device is again raised the piston washers and cage will be removed therewith from the pump tubing without the necessity of pulling the latter from the well.

A further object is to provide a device of the above kind which is automatic in operation and by means of which a great amount of time, labor and annoyance is saved in the recovery of detached piston washers and cages.

Other objects are to provide means for preventing accidental expansion of the gripping members of the tool while the latter is being lowered into the tubing, and to provide means whereby the gripping members may be readily released to effect detachment of the washers and cage from the tool when the latter has been raised to the surface.

The invention consists in the novel form, combination and arrangement of parts hereinafter more fully described, shown in the accompanying drawings and claimed.

In the drawings, Figure 1 is a vertical section through a well and a lower piston cage, illustrating the manner in which my device enters the cage.

Figure 2 is a view somewhat similar to Figure 1, illustrating the manner in which the device or tool operates for gripping the cage.

Figure 4 is an enlarged horizontal section on line 4—4 of Figure 1.

Figure 6 is a perspective view of the wedge-carrying rod.

Figure 1:
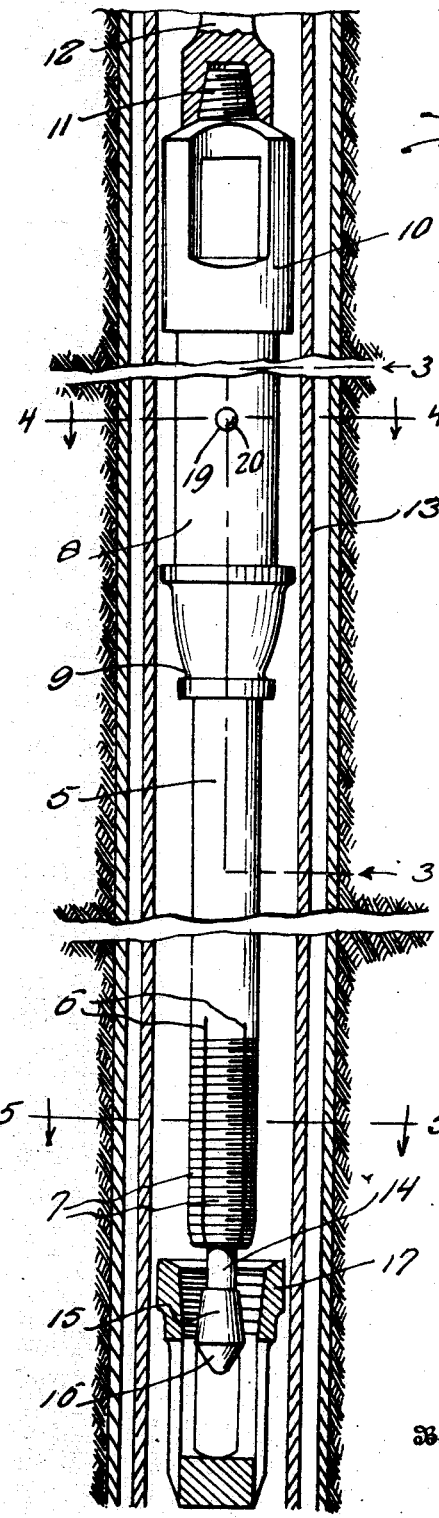
Figure 3:
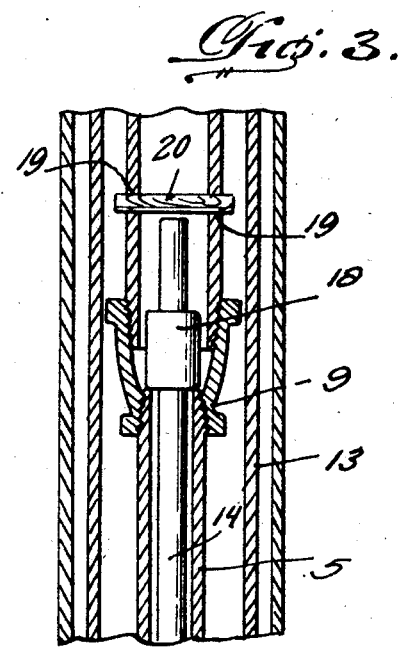
Figure 3 is a fragmentary vertical section on line 3—3 of Figure 1.
Figure 5:
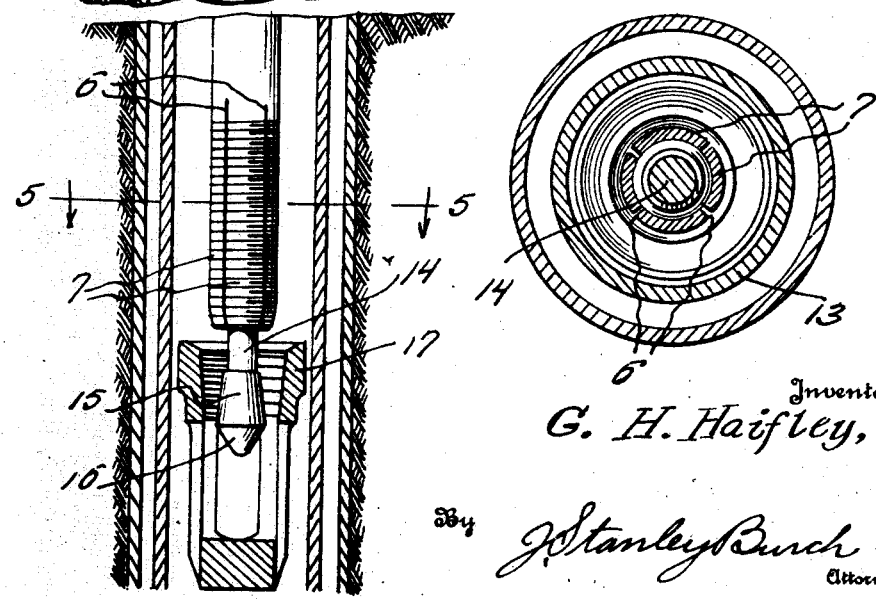
Figure 5 is an enlarged horizontal section on line 5—5 of Figure 1.

Referring more in detail to the drawings, the present invention embodies a tubular body 5 having a plurality of longitudinal slits 6 in the lower end portion thereof to define a plurality of resilient gripping members 7, the lower end portion of the body being preferably externally threaded to provide the gripping members with thread-engaging teeth, as shown.

Removably applied to the upper end of the body 5 is a cap member including a tubular member 8 of larger diameter than the body 5 and having a reduced lower part 9 removably threaded onto the upper end of the body 5, and member 10 on the upper end of member 8 formed with an upwardly projecting threaded stem 11 by means of which the fishing tool is secured to the lower end of a rod 12 attached to the sand line by which the tool is lowered into the well tubing 13.

Freely movable in and longitudinally of the body 5 is a rod 14 that has a tapered head or wedge 15 rigid with the lower end thereof, the wedge 15 being movable upwardly into the lower end of the body 5 to expand the gripping members or jaws 7 and having a tapered or rounded nose 16 to readily enter the detached washers and the detached lower piston cage 17. The rod 14 extends upwardly into the cap member 8 and has an enlargement or stop member 18 near its upper end adapted to engage the upper end of the body 5 when the wedge 15 is in lowered released position, so as to prevent excessive downward movement of the rod 14 and the wedge relative to the body 5.

Provided in the cap member 8 are a pair of transversely alined openings 19 adapted to receive a frangible cross-pin or stick 20 so that the latter will overlie the upper end of rod 14 when the wedge is released, thereby preventing upward movement of the wedge to jaw-expanding position should the wedge accidentally engage an object, such as when the tool is being lowered into the well tubing.

In operation, the fishing tool is lowered in- to the well until it comes in contact with the detached piston washers or cage. The tapered nose of the wedge guides the tool through the washers and into the cage, and when the wedge strikes the bottom of the cage as shown in Figure 2, the wedge and the rod 14 are forced upwardly relative to the body 5 so as to break the frangible pin 20 and allow the wedge to enter the body 5 so as to expand the jaws 7 into firm engagement with the cage 17 when the latter is internally threaded. The washers and cage are thus positively prevented from escaping from the tool and may then be lifted with the tool from the well. When the tool is raised to the surface, the cap is detached from the upper end of the body 5 so as to expose the upper end of rod 14, and by tapping on the latter, the wedge may be released sufficiently to permit contraction of the jaws and removal of the cage and washers from the tool.

Minor changes may be made without departing from the spirit and scope of the invention as claimed.

What I claim as new is:

1. A fishing tool for oil wells comprising a tubular body provided at its lower end with a plurality of gripping jaws, a cap removably applied to the upper end of the body and adapted for connection to a hoist line or the like, a rod freely longitudinally slidable in the body and projecting upwardly into the cap, a wedge rigid with the lower end of the rod adapted to be forced upwardly by impact with an object to expand the jaws, means to limit downward movement of the rod relative to the body, and a frangible member in the cap in the path of said rod to prevent accidental upward displacement of the wedge to jaw-expanding position.

2. A fishing tool for oil wells comprising a tubular body provided at its lower end with a plurality of gripping jaws, a cap removably applied to the upper end of the body and adapted for connection to a hoist line or the like, a rod freely longitudinally slidable in the body and projecting upwardly into the cap, a wedge rigid with the lower end of the rod adapted to be forced upwardly by impact with an object to expand the jaws, and means to limit downward movement of the rod relative to the body, said cap having a pair of transversely alined openings, and a frangible pin positioned in the openings and across the upper end of said rod to prevent accidental displacement of the wedge to jaw-expanding position.

3. A fishing tool for oil wells comprising a tubular body provided at its lower end with a plurality of gripping jaws and adapted for connection at its upper end to a hoist line or the like, a wedge supported at the lower end of the body and adapted to be forced upwardly by impact with an object to expand the jaws, and means including a frangible member to prevent accidental upward displacement of the wedge.

In testimony whereof I affix my signature.

GEORGE H. HAIFLEY.